(12) United States Patent
Stockmar et al.

(10) Patent No.: US 8,879,110 B2
(45) Date of Patent: Nov. 4, 2014

(54) PRINTING METHOD AND PRINTING APPARATUS

(71) Applicants: Martin Stockmar, Poing (DE); Robert Baumgartner, Woerth (DE)

(72) Inventors: Martin Stockmar, Poing (DE); Robert Baumgartner, Woerth (DE)

(73) Assignee: Océ Printing Systems GmbH, Poing (DE)

(*) Notice: Subject to any disclaimer, the term of this patent is extended or adjusted under 35 U.S.C. 154(b) by 19 days.

(21) Appl. No.: 13/866,207

(22) Filed: Apr. 19, 2013

(65) Prior Publication Data

US 2013/0278969 A1 Oct. 24, 2013

(30) Foreign Application Priority Data

Apr. 20, 2012 (DE) .................. 10 2012 103 466

(51) Int. Cl.
| | |
|---|---|
| G06K 15/00 | (2006.01) |
| G06F 3/12 | (2006.01) |
| B41J 13/00 | (2006.01) |
| G06K 15/02 | (2006.01) |

(52) U.S. Cl.
CPC ......... *G06K 15/1817* (2013.01); *B41J 13/0027* (2013.01); *G06K 15/186* (2013.01); *G06K 15/1868* (2013.01); *G06K 15/1894* (2013.01)
USPC ........ 358/1.17; 358/1.16; 358/1.11; 358/1.15

(58) Field of Classification Search
None
See application file for complete search history.

(56) References Cited

U.S. PATENT DOCUMENTS

| | | | |
|---|---|---|---|
| 7,399,043 B2* | 7/2008 | Walmsley et al. | ............... 347/13 |
| 7,804,621 B2 | 9/2010 | Drexler | |
| 2003/0011650 A1 | 1/2003 | Asakawa | |
| 2007/0172270 A1 | 7/2007 | Jorgens et al. | |
| 2012/0075371 A1 | 3/2012 | Baumgartner | |
| 2012/0224196 A1 | 9/2012 | Baumgartner et al. | |

FOREIGN PATENT DOCUMENTS

| | | |
|---|---|---|
| DE | 102010037303 | 3/2012 |
| DE | 102010037854 | 3/2012 |
| DE | 102011000220 | 7/2012 |
| WO | 2012098190 | 7/2012 |

* cited by examiner

*Primary Examiner* — Marcus T Riley
(74) *Attorney, Agent, or Firm* — Schiff Hardin LLP

(57) ABSTRACT

In a method for printing recording media successively supplied to a printing unit, and wherein a sheet gap is provided from a preceding recording medium, document print data are subjected to a rastering process. A predetermined nominal number of lines is respectively provided for the document print data of a page. The raster print data are successively stored line by line in a print data memory region of an electronic memory. A blank line memory region for a blank line that is not to be filled with print data is provided in the memory. The raster print data are successively read out per line from the print data memory region of the memory and are supplied to the printing unit. After the read out of the nominal number of lines from the print data memory region, the blank line memory region is then read out a number of times, said number of times being a whole number greater than or equal to zero and being dependent on the sheet gap.

9 Claims, 3 Drawing Sheets

PRINTING METHOD AND PRINTING APPARATUS

BACKGROUND

The disclosure concerns a printing method and a printing apparatus.

Digital printing apparatuses are in the position to individually print items of information line by line and in particular pixel by pixel. For example, such printing apparatuses are based on electrographic, magnetographic or inkjet techniques. The printing apparatuses are thereby normally designed either to print to sheet-shaped recording media or to print to web-shaped recording media.

US 2007/0172270 A1 shows what is known as a single page printing system to print to sheet-shaped recording media. The individual sheets are thereby drawn from a sheet stock; selectively supplied to one of two printing stations; printed there; the print image is subsequently fixed on the respective sheet; and the sheet is subsequently supplied to an output unit.

In the printing of single sheets, the requirement exists (otherwise than in the printing of web-shaped recording media) to position the print image on the respective single sheet in register with the respective edges of the sheet that are situated transverse to the paper travel direction or the printing direction. For this, upon transport of the individual sheets in the printing apparatus it is necessary to ensure that the individual sheets arrive at the respective printing stations at predetermined points in time. In order to compensate for speed fluctuations and avoid that two sheets collide or even overlap during the transport, a certain interval (what is known as a "gap") is normally provided in the transport of sheets in the single page printing apparatuses.

A method and a system with which sheet gaps in the single page printing system can be calculated and monitored is described in U.S. Pat. No. 7,804,621 B2.

In the German Patent Application Nr. 10 2011 000 220.0 (not published prior to this Application), a digital printing system is described in which the printing process is controlled so that an in-register [positionally accurate] printing on the recording medium is possible when the recording medium is transported past a print head at variable speed.

In the German Patent Application Nr. 10 2010 037 303.6 by the applicant, a method is described for per-point activation of a print head in which pixel data are sorted in a data sorting memory and then are read out line by line to control the print head.

In the German Patent Application Nr. 10 2010 037 854.2 by the applicant, a method is described for controlling a printing process in an inkjet printing apparatus in which a line clock is generated for printing a print line, and individual print heads are individually activated with an offset relative to the line clock to eject printing ink.

The previously described publications and Patent Applications or, respectively, Patent Applications corresponding with these in other countries, are herewith incorporated by reference into the present Specification.

SUMMARY

It is an object to achieve a high print speed in the printing of sheet-shaped recording media in a digital printing apparatus.

In a method for printing recording media successively supplied to a printing unit, and wherein a sheet gap is provided from a preceding recording medium, document print data are subjected to a rastering process. A predetermined nominal number of lines is respectively provided for the document print data of a page. The raster print data are successively stored line by line in a print data memory region of an electronic memory. A blank line memory region for a blank line that is not to be filled with print data is provided in the memory. The raster print data are successively read out per line from the print data memory region of the memory and are supplied to the printing unit. After the read out of the nominal number of lines from the print data memory region, the blank line memory region is then read out a number of times, said number of times being a whole number greater than or equal to zero and being dependent on the sheet gap.

DESCRIPTION OF PREFERRED EXEMPLARY EMBODIMENTS

Figure 1:
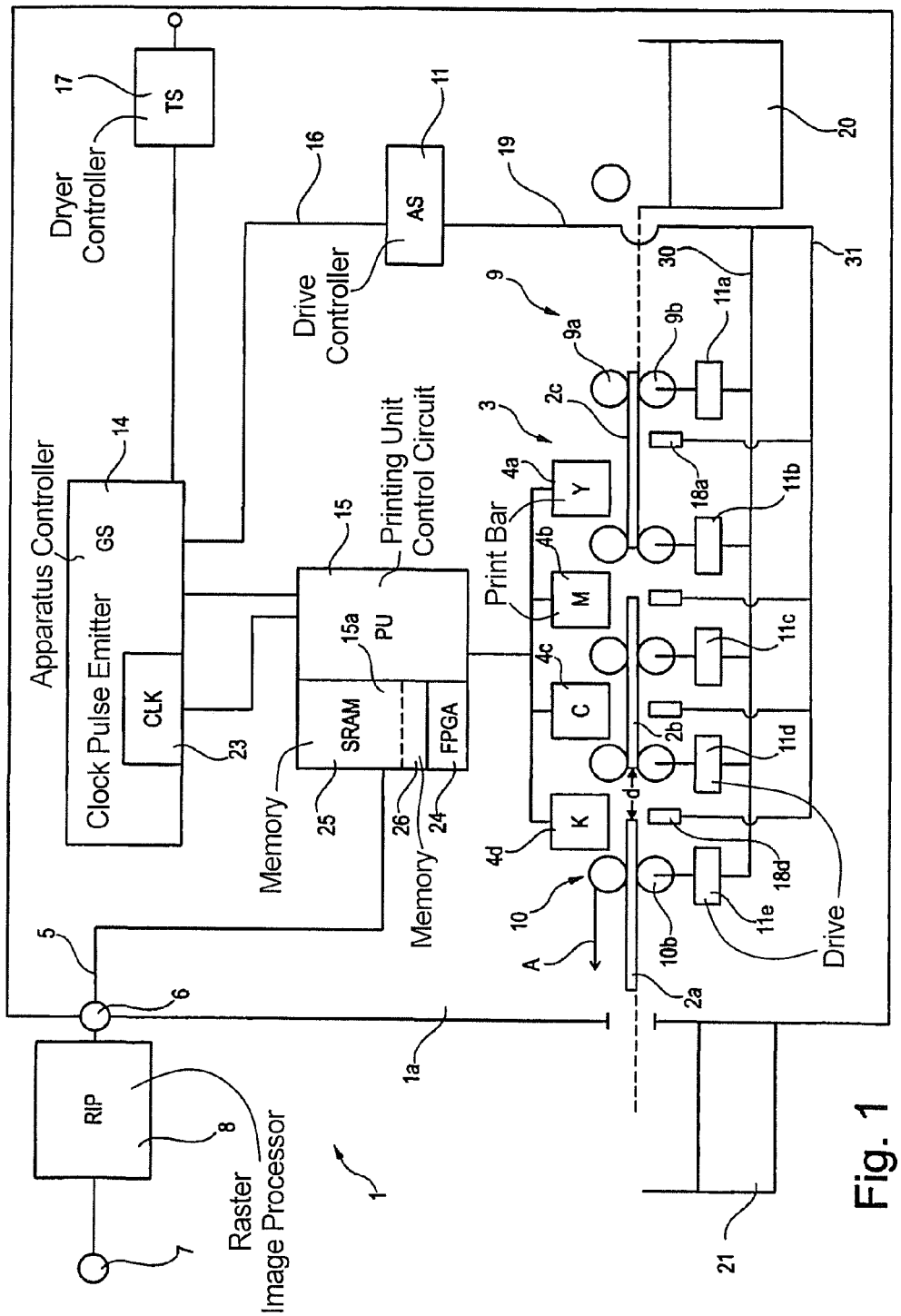
FIG. 1 illustrates a printing system.

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

According to an exemplary embodiment, for per-page printing of sheet-shaped recording media in a printing device it is provided to supply the recording media successively, one after another, to at least one printing unit that can be activated per point, respectively with a sheet gap from a preceding recording medium in a transport direction. Furthermore, document print data that are structured per page are subjected to a rastering process in which raster print data that are structured per line and per page are generated. A respective, predetermined nominal count NA of lines is respectively provided for the document print data of a page. The raster print data are successively stored line by line in a print data memory region of an electronic memory. Furthermore, a blank line memory region for a blank line that is not to be filled with print data is provided in the memory. The raster print data are then successively read out per line from the print data memory region of the memory and supplied line by line to the printing unit. Respectively after the readout of the nominal number NA of lines from the print data memory region, the blank line memory region is then read out a number LZ of times, wherein LZ is a whole number greater than or equal to zero and is dependent on the sheet gap.

The print data memory region can be so large that it can accept the data of all NA lines of a page. However, it can also be smaller. During the printing process, data of already printed lines can be deleted and data of successive lines of the same page can be stored in the corresponding memory region. The memory can then advantageously be designed as a ring memory.

For example, the electronic memory can comprise a hardware memory unit (for example an SRAM memory module)

or multiple memory units whose memory administrations interact. The memory is in particular designed as an image memory in which pixels can be stored per pixel as what are known as bitmaps in a bit coding.

The exemplary embodiment is based on the knowledge that a ring memory arrangement via which the line data of all pages can be processed in succession, one after another, can be achieved via the continuative, successive readout of the print data memory region of a ring memory arrangement. The exemplary embodiment is furthermore based on the realization that, by achieving a blank line memory region that is administered and controlled independently of a print data memory region, an arbitrary (and in particular variable) number of intermediate lines can be inserted between the last print data line of a first page and the first print data line of a successive page with very low control cost, and an in-register and complete printing of all print data on the successive, sheet-shaped recording media. Furthermore, the exemplary embodiment is based on the realization that, with such a method, blank lines must only be inserted in the overall printing process at a point wherein this is possible variably and at low cost, and wherein the remaining data processing control processes (in particular the control of sides of the printing unit) do not need to be further modified.

According to an advantageous exemplary embodiment of the invention, it is provided that the print data memory region is used as a ring buffer with a memory start address and a memory end address, such that data are read out in the same order as they have been stored, and the respective write access or read access to the start memory address is continued upon reaching the memory end address both in storing and reading out data. In contrast to this, the blank line memory region is accessed independently by the write accesses and read accesses to the ring memory.

The writing to and readout of the memory can in particular be controlled with an address controller that coordinates the respective accesses to the ring buffer and the blank line memory region such that, during phases in which no recording medium is present at the printing unit for printing, raster print data can be stored in the ring buffer and read from this on the one hand, and on the other hand the blank line data of the blank line memory region are output to the printing unit.

Both the storing in the respective memory regions and the readout of data from the respective memory regions in particular take place continuously and/or with a clock frequency that is adapted to the print speed of the printing unit.

Furthermore, the address controller can advantageously use a line address unit and a pointer memory, in which pointer memory memory addresses of the memory can respectively be stored that mark the start of the data of a print line. The line address unit can comprise a counter. A start memory address of the pointer memory that marks the start of the data with regard to an initial nozzle row of the printing unit can thereby be stored first in the counter. For printing, data from the print data memory can respectively be read out at an address that is determined from the output memory address, minus a predetermined offset value.

By means of a subtracter, after every printing process of a print line the counter can be reduced by a predetermined number (by one, for example) until the counter reaches a predetermined value (in particular NA−1). The counter can then be reset to zero.

Furthermore, to determine the number of blank lines LZ to be output it can advantageously be provided to measure sheet gap between two successive, sheet-shaped recording media during their transport and/or to provide an adjustable parameter.

The exemplary embodiment allows the read and/or write accesses to the print data stored in the ring buffer to be decoupled from the read accesses to the memory region in which the blank line is stored, i.e. to interrupt the read/write processes of the ring buffer (also called a ring memory in the following) as needed for a variably long period of time, and to output the information "BLANK" (for example a value of zero) for all pixels of the blank line during this time period, i.e. by a variable number.

If the blank line is stored in the same image memory unit as the raster print data, this image memory unit can be used to save on resources in the process of providing the control data for the print head for both jobs, i.e. on the one hand for the buffering of incoming print data and on the other hand for the tailored insertion of blank lines into the output-side control data for an in-register printing to successive sheet-shaped recording media.

Furthermore, with the exemplary embodiment it is possible in principle to insert arbitrarily many line signals with a value of NULL into the output-side control signals. The corresponding control can take place via the address controller for the image memory, for example, wherein corresponding input values (such as device settings for the sheet gap or a physical sheet gap measured by means of sensors at a predetermined point of the transport path of the recording medium) can be used for the address control, and therefore to establish the number of blank lines that are introduced.

With the exemplary it can also be achieved that no further modifications to the controller are necessary on the part of a print head in order to ensure that all related print data of a document page are printed on a common side of a recording medium. Data continuously arrive at the print head, independent of whether a printable sheet is present at the print head or not. In the phase in which no recording medium is present at the print head, the described controller automatically sends a defined number of blank line data to the print head with invariant clock rate corresponding to a defined print resolution and sheet transport speed.

It can consequently be achieved that no data are lost in the printing process in that they are present at the print head while an intervening space between two successive recording medium sheets is located precisely at the print head, i.e. no transfer printing to a sheet can take place. Furthermore, it can thereby be achieved that associated print data of one page are not incorrectly printed by the print head on different (in particular successive) sheets.

Complex print head arrangements, for example with multiple thousands to many thousands of ink nozzles and partially overlapping print heads arranged offset from one another, can also be safely controlled with the exemplary embodiment so that complete print images are generated on the individual sheets, data are not unintentionally printed on the wrong sheet, and only relatively small intervening spaces must be maintained between successive sheets. The productivity (printing capacity per time unit) of a correspondingly equipped printing apparatus is thereby increased.

Within the scope of the exemplary embodiment, a control device for a printing unit; a printing apparatus; and a computer program product are proposed with which the method according to the exemplary embodiment can be executed.

Additional advantages and exemplary embodiments of the invention are described in the following drawing Figures.

In FIG. 1, a printing system 1 is shown in which paper sheets 2a, 2b, 2c are directed past a print head arrangement 3 (which is fixed in the apparatus) along a transport direction A in a digital printing apparatus 1a. It has four print bars 4a, . . . , 4d for the colors yellow (Y), magenta (M), cyan (C)

and blank (K) that print color separations point by point or line by line by means of the inkjet technique to the paper sheets 2a, 2b, 2c directed past them.

The print head arrangement 3 receives control signals from a print head control circuit 15 and the print data via a print data line 5. The print data line 5 leads to an interface 6 via which image data rastered per pixel are supplied from a raster image processor (RIP) 8 to the printing apparatus 1a. Via an interface 7, the raster image processor 8 can in turn receive at its input side print data encoded in a known print data language such as AFP/IPDS, PPML, PDF, PCL, PostScript etc.

In the control device 15, the print data rastered per pixel that are received by the raster processor 8 are translated into control signals for the print head arrangement 3. Methods and control components can thereby be used that are cited in the aforementioned German Patent Applications Nr. 10 2010 037 303.6 and 10 2010 037 854.2. The content of these Patent Applications is therefore again incorporated by reference at this point.

In the printing apparatus 1a, the paper sheets 2a, 2b, 2c are transported by means of a drive system that comprises at least one drive controller 11, a roller 9a driven at the input side, and a roller 10b driven at the output side. The paper sheets 2a, . . . , 2c are drawn from a paper stack into a sheet feed device and stored in a sheet storage 21 after the printing.

The paper sheets 2a, 2b, 2c are respectively successively supplied to the print heads 4a, . . . , 4d, wherein they have an interval from one another. As shown in FIG. 1, the interval d can respectively be the same between two paper sheets over the entire transport phase through the print head arrangement 3, or can also be adjusted differently, individually to the print head.

Furthermore, the printing apparatus has an apparatus controller 14 to which multiple sub-units (sub-module controllers) are connected, for example a drive controller 11 for the transport of the paper sheets 2a, 2b, 2c via a line 16; a controller 17 for a drying device to dry or fix the printed ink on the paper sheets 2a, 2b, 2c etc. A clock 23 sends high-frequency clock signals that can be used for synchronization by all control components that are connected to the apparatus controller 14 and relevant to the printing process.

The drive controller 11 controls the drives 11a, . . . , 11e for the drive rollers 9b, 10b via line 19. For this it is connected with said drives via a line 30. At the same time, it is connected via a line 31 with leaf sensors (for example 18a, 18d) that are arranged just before the different print bars 4a, . . . , 4d along the transport path for the recording medium in order to respectively detect the clearance of successive sheets. The measured sheet interval can then be communicated via the drive controller 11 to the apparatus controller 14 and from there to the control circuit 15 for the printing unit. There the control for the print bars 4a, . . . , 4d can then be adapted accordingly using the sheet interval.

Which problem results for an in-register printing to single sheets by means of inkjet print heads in a high capacity cut-sheet printing apparatus is subsequently explained using FIG. 2. Multiple ink print heads are thereby provided for each print color, which ink print heads are arranged in parallel in what is known as a print bar and span over the entire printing width.

Figure 2:
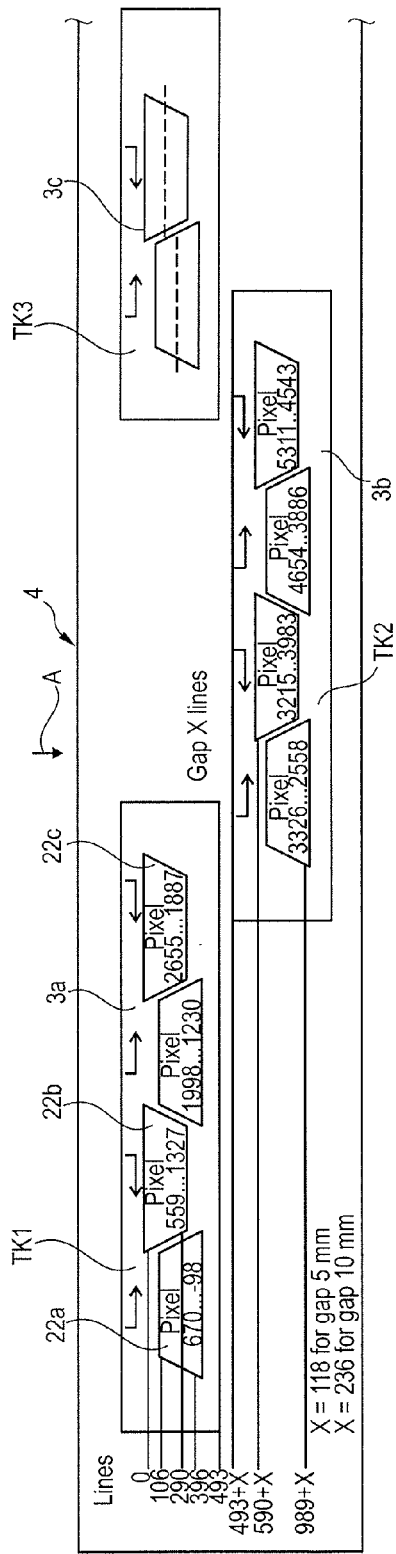
FIG. 2 illustrates a print bar.

FIG. 2 shows such a print bar 4 schematically with three ink print heads, wherein the ink print head to the upper left is designated with TK1, the ink print head in the lower middle is designated with TK2, and the ink print head to the upper right is designated with TK3. Each of the ink print heads TK1, TK2, TK3 is further divided into four units, of which each comprises 664 nozzles that are divided up into 16 nozzle rows. For example, the head TK2 has the units 22a, 22b, 22c.

The nozzle rows of a unit are respectively arranged in parallel with one another and in their entirety form a trapezoid, wherein the number of nozzles extends from 49 in the longest row to 34 in the shortest row. In the printing operation, a controller (for example the controller 15; FIG. 1) sends the print data to the print heads TK1, TK2, TK3 and—via a control signal—activates all nozzles in the ink print heads TK1, TK2, TK3 that thereupon eject ink droplets corresponding to the previously transferred print data.

What is different than in laser printers—which typically print an entire line per printing process or line clock—is that the ink print heads TK1, TK2, TK3 generate multiple incomplete lines on the recording medium 2a, . . . , 2c (which can be a paper sheet, for example) per printing process, which incomplete lines are then supplemented bit by bit in the course of the sheet movement in its transport direction A.

In order to print a complete line, given the above arrangement of the ink print heads TK1, TK2, TK3 the paper sheet must move forward by 1107 or 1225 lines. Expressed in another way: given a single printing process, an ink print head TK1, TK2, TK3 generates points on the paper sheet that lie distributed in a region of up to 1225 lines. This region between the first nozzle row of the first print head and the lowermost nozzle row of the second print head is called BarArea in the following. The line count 1107 or 1225 results here from the distance of the ink print head TK1 and TK3 from the ink print head TK2. This character of the ink printer is in particular to be noted at the start and end of a sheet in order to ensure that only those nozzles below which paper is also located or which are required for image generation generate a droplet.

This should be explained in detail in an example with only one unit. A unit thereby comprises 16 nozzle rows that are situated in the order from 1 to 16 in the lines 1, 19, 61, 73, 79, 91, 131, 143, 149, 161, 203, 215, 221, 233, 273 and 291. If the paper sheet moves to the unit, first the nozzle row 1 thus generates a droplet in line 1; after movement of the paper by 19 lines the nozzle rows 1 and 2 generate a droplet; after movement by 61 lines the nozzle rows 1, 2 and 3, after 73 lines the nozzle rows 1 through 4 etc. until all 16 nozzles generate a droplet after 291 lines. At the page end, this process runs in the reverse order. The nozzle row 1 stops printing first, followed after 19 lines by the nozzle row 2, until the nozzle row 16 generates the last pixel of the last line on the paper sheet.

The same also applies to the arrangement with three ink print heads. One side is then first completely printed when the nozzle row of the lowermost unit of ink print head TK2 has completed the last line of the side.

If a cut-sheet printer prints with the method described above, the gap between two pages must be at least as large as the bar area, thus the number of lines which the respective arrangement of ink print heads prints in a single printing process. Given a resolution of 600 dpi, this corresponds to 46.8 mm given 1107 lines or 51.8 given 1225 lines. In addition to the paper travel speed, this gap defines the maximum number of pages per minute that the cut-sheet printer can print. Since the paper travel speed cannot be arbitrarily increased for technical reasons, only the gap between the pages remains as an additional optimization factor in order to increase the number of pages per minute.

The page gap can be reduced (and therefore the print speed can be increased) with the methods described in the following using FIGS. 3 and 4. For an easier understanding, an ink print head 22 is thereby assumed that comprises three nozzle rows with an interval of 100 lines that should be designated (according to their spacing from one another) as nozzle row 0, nozzle row 100 and nozzle row 200, wherein the number of nozzles in the nozzle row is irrelevant to the explanation.

With a print head arrangement in which multiple print heads and/or print head lines (for example inkjet nozzle rows or LED lines) are arranged offset from one another in the paper transport direction, the control in the intervening space between successive paper sheets is markedly more difficult relative to a print head arrangement in which only one print head line is provided. While given only one print head line it is easily possible to prevent the image output in the region of the intervening space—for example via a method in which the image output is interrupted while passing by the intervening space—this cannot take place without further measures in an arrangement with the print head lines offset from one another because the pixels at a printed image line thereby originate from different print head lines that are offset from one another. If one desires to transfer the simple method to such an arrangement, for every single print nozzle it would need to be established when its printing process is interrupted. A method according to the exemplary embodiment is subsequently described with which this difficulty can be overcome, wherein the control cost can be kept advantageously low.

Figure 3:
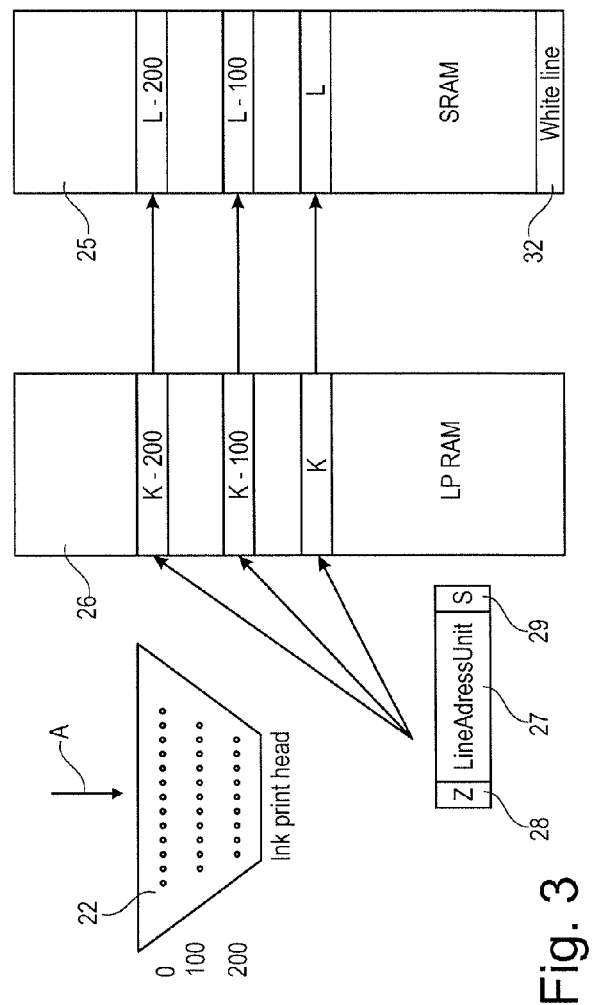
FIG. 3 illustrates a memory administration.

As has already been described in the preceding and as shown in detail in FIG. 3, the nozzle row 0 prints the first pixel on the paper sheet and the nozzle row 200 prints the last pixel of a page. The paper sheet thus moves from the nozzle row 0 in the direction A of nozzle row 200.

Figure 4:
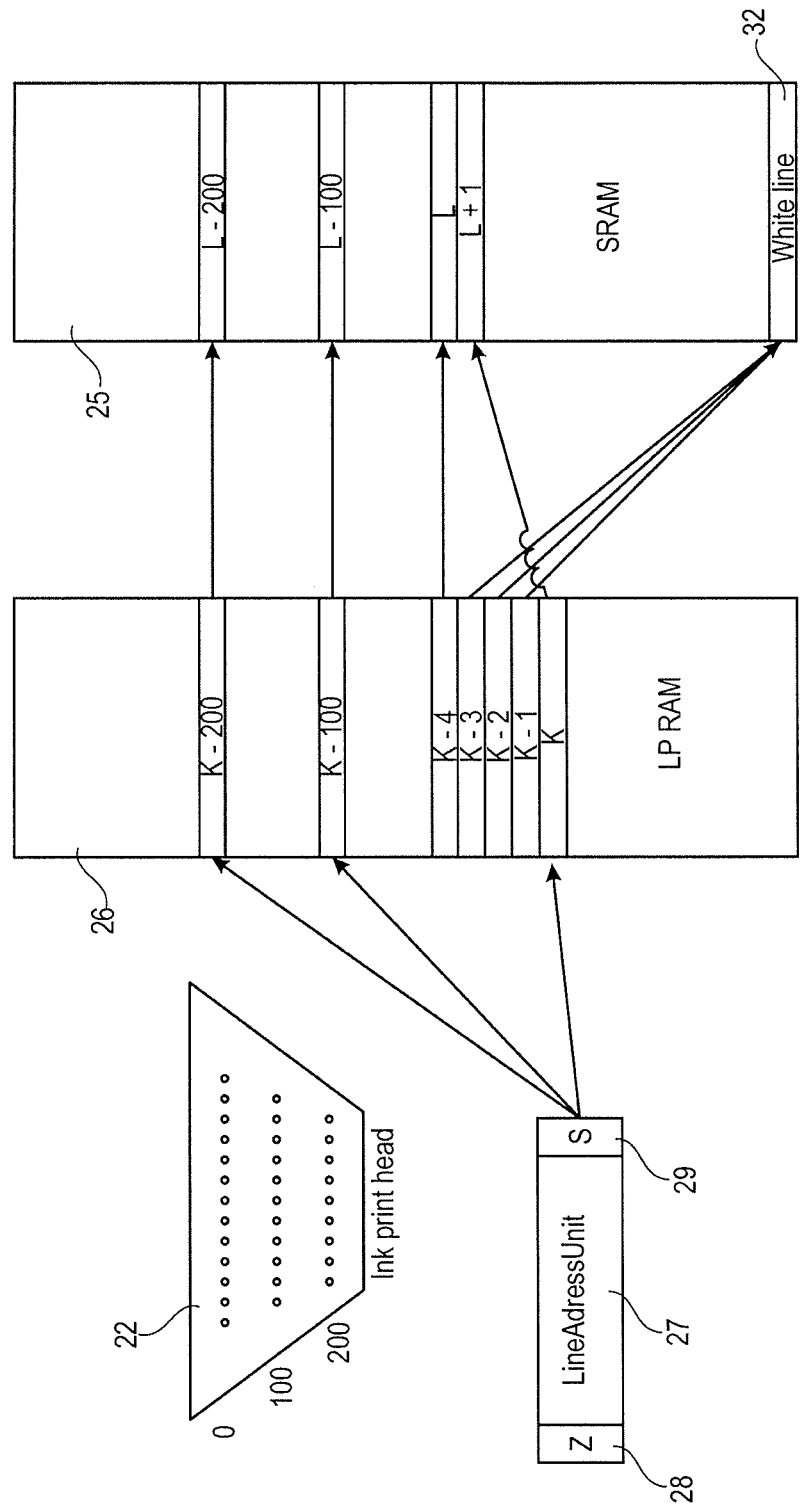
FIG. 4 illustrates a memory administration for the insertion of blank lines.

For example, a control unit that controls the ink print heads—for example the unit 15 shown in FIG. 1—comprises a programmable control logic module (Field Programmable Gate Array, FPGA) and a volatile electronic semiconductor memory 15a external to the logic module, which semiconductor memory 15a is made up of one or more SRAM (Static Random Access Memory) modules and in which rastered image data (bitmaps) can be stored in a first memory region 25 (FIGS. 1, 3 and 4).

The memory administration process is now described in detail using FIGS. 3 and 4. The first memory region 25 of the external memory 15a (called PixelRAM in the following) accepts the line data to be printed, which line data the control circuit 15 receives via connection 5 (FIG. 1). The memory space in PixelRAM 25 comprises n+1 lines, wherein n lines are provided for the storage of the print lines; the (n+1)-th line represents what is known as the white line 32, meaning that the data in this line include the coding for white pixels, for example a value of NULL.

A control logic for process control is implemented in the FPGA 24, which control logic can alternatively also be realized with a computer program that can be loaded and executed at a computer. An additional memory 26—the LinePointerRAM (LPRAM)—that includes the start address of the lines in PixelRAM 25 is located in the FPGA. The controller of the FPGA 24 loads these addresses in the initialization phase of the control circuit 15 (also called a controller board in the following) into a second memory region of the memory 15a (the LinePointerRAM 26), wherein the first entry appears on the first lines in PixelRAM 25, and the second entry appears at its second line etc. Every address results from the preceding address plus the line length. The address of the LinePointerRAM 26 is generated in a line addressing unit 27 (also called a LineAddressUnit) that comprises a counter 28 and a subtracter 29.

The counter 28 includes the respective address of the 0th nozzle row in LinePointerRAM 26 (called K in this example). Depending on the printing process, the controller 15 increments the counter by one. If the counter reaches a value of n−1, the controller 15 resets to zero. This type of address generation ensures that the PixelRAM 25 acts as a ring memory. The address in LinePointerRAM 26 represents the start address of the associated line L in PixelRAM 25. Using this address, the controller 15 transfers the pixel from PixelRAM 25 to the FPGA in order to prepare it there for the printing process. For the two other nozzle rows of the ink print head, an offset value 100 or 200 is subtracted once from the counter value K and the corresponding line L−100 or L−200 is addressed in this way. If the result of the subtraction turns out to be negative (K is thus smaller than 100 or 200), in this case instead of K−100 the value n−1+K−100 is calculated. This corresponds to the transition of the counter in the LineAddressUnit 27 from n−1 to zero.

Within the first print data side, the controller 15 increments only the counter 28 in the LineAddressUnit 27. However, this changes at the page end when an intervening space (for example between two successive sheets of paper) should remain unprinted. The value K in the counter of the LineAddressUnit27 now appears on the last line in the page (the line L in PixelRAM 25). If the pages are situated nearly seamlessly with one another, it is sufficient to only increment the counter to K+1 in order to therefore be able to address the line L+1, thus the first line of the new page. In the case of a desired intervening space—for example if two successive paper sheets have a distance d from one another at a print bar (FIG. 1)—the controller 15 then initiates the printing of white lines in this region. For this, after incrementing the counter in the memory cell K+1 of LinePointerRAM 26 the controller 15 enters the address of the white line 32. Instead of the pixel from line L+1, the controller 15 retrieves white pixels from PixelRAM 25 for the next line. White pixels mean that the ink print head generates no ink droplets. The controller 15 additionally notes the start address of line L+1 in PixelRAM 25. Except for the storage of the address of the (L+1)-th line, this process repeats for every line of the region between the pages to be printed. After the last line of the desired intervening space, as before the controller 15 increments the counter in the LineAddressUnit 27 but does not enter the address of the white line 32 into the LinePointerRAM 26 but rather enters the address of the line L+1, thus the first line of the new page which the controller 15 has previously buffered.

The following example assumes an interval of three lines between the sheets to be printed. Image 3 shows the state four lines after the last line of the first page. Corresponding to the interval of three lines between the two sheets, the entry <K−1> to <K−3> in LinePointerRAM 26 points to the white line 32. The value stored at the end of the preceding page (which value points to the line L+1 in PixelRAM 25, thus the first line of the second page) is situated at the entry <K>. As of this point in time, the controller enters the value of the preceding cell plus the length of the line in PixelRAM 25 into the LinePointerRAM 26 in the cell to which the counter points in LineAddressUnit 27. The same thing applies here as for the address calculation in LineAddressUnit 27. In the n-th entry in LinePointerRAM 26, instead of the preceding value plus the line length the controller 15 must enter the address of the first line in PixelRAM 25, which normally is at zero. This process continues until the end of the page and therefore automatically overwrites the entries for the white line 32 in LinePointerRAM 26.

The number of white lines between the individual pages can either be fixed via an internal parameter or be predetermined via a register. It can also be provided that an external signal induces the controller to end the insertion of white lines. For example, the signal can be derived from sensor values of the sheet interval sensors 18a, 18d (FIG. 1).

The FPGA is a control device. Computer programs can be used to configure the FPGA. Such configuration programs or program sections are computer program products in the sense of the exemplary embodiment. However, computer programs or computer program products according to the exemplary embodiment can just as well be loaded into a conventional computer system (equipped with a processor, working memory, possibly a network card etc.) and run there. They can be stored on a digital data medium (a DVD-ROM, for example) or be exchanged as files via a computer network or be downloaded from another computer (a server, for example).

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as my invention:

1. A method for per-page printing of sheet-shaped recording media in a printing device, in which the recording media are successively supplied, one after another, to at least one printing unit that can be activated per point, a sheet gap from a preceding recording medium being provided in a transport direction, comprising the steps of:
    subjecting document print data that are structured per page to a rastering process in which raster print data that are structured per line and per page are generated;
    respectively providing a predetermined nominal number of lines for the document print data of a page;
    successively storing the raster print data line by line in a print data memory region of an electronic memory;
    providing in the memory a blank line memory region for a blank line that is not to be filled with print data;
    successively reading out per line the raster print data from the print data memory region of the memory and supplying the raster print data line by line to the printing unit; and
    after the readout of the nominal number of lines from the print data memory region, then reading out the blank line memory region a number of times, said number of times being a whole number greater than or equal to zero and being dependent on the sheet gap.

2. The method according to claim 1 wherein
    the print data memory region is used as a ring buffer with a start memory address and an end memory address, such that data are read out in a same order as they were stored, and upon reaching the end memory address a respective write or read access is continued at the start memory address in both the storage and the readout of data, and
    the blank line memory region is accessed independently of the write and the read accesses to a ring buffer.

3. The method according to claim 2 wherein the writing to and the reading from the memory is controlled with an address controller that coordinates respective accesses to the ring buffer and to the blank line memory region such that, during phases in which no recording medium is present at the printing unit for printing, raster print data can be stored in the ring buffer in an unmodified line scheme and can be read from the ring buffer on the one hand, and on the other hand blank line data of the blank line memory region are output to the printing unit.

4. The method according to claim 3 wherein the address controller uses a line address unit and a pointer memory, wherein memory addresses of the print data memory that mark a start of the data of a print line are respectively stored in the pointer memory, and
the line address unit comprises a counter, wherein a start memory address of the pointer memory that marks a start of the data with regard to an initial nozzle row of the printing unit is stored in the counter.

5. The method according to claim 4 wherein for printing, data from the print data memory are respectively read out at an address that is determined from an output memory address minus a predetermined offset value.

6. The method according to claim 1 wherein to determine the number of times the blank line memory is readout, the sheet gap between two successive, sheet-shaped recording media during their transport is measured and/or an adjustable parameter is provided.

7. A printing apparatus for per-page printing of sheet-shaped recording media, comprising:
    a printing device in which the recording media are successively supplied, one after another, to at least one printing unit that can be activated per point, a sheet gap from a preceding recording medium being provided in a transport direction;
    a raster image processor in which document print data that are structured per page are subjected to a rastering process in which raster print data that are structured per line and per page are generated;
    a control device to which is respectively provided a predetermined nominal number of lines for the document print data of a page;
    said control device having an electronic memory with a print data memory region where the raster print data are successively stored line by line;
    said electronic memory having a blank line memory region for a blank line that is not to be filled with print data;
    said control device successively reading out per line the raster print data from the print data memory region of the memory and supplying the raster print data line by line to the printing unit; and
    said control device, after the readout of said nominal number of lines from the print data memory region, then reading out the blank line memory region a number of times, said number of times being a whole number greater than or equal to zero and being dependent on the sheet gap.

8. A non-transitory computer readable medium comprising a computer program for per-page printing of sheet-shape recording media in a printing device, in which the recording media are successively supplied, one after another to at least one printing unit that can be activated per point, a sheet gap from a preceding recording medium being provided in a transport direction, said program performing the steps of:
    subjecting document print data that are structured per page to a rastering process in which raster print data that are structured per line and per page are generated;
    respectively providing a predetermined nominal number of lines for the document print data of a page;
    successively storing the raster print data line by line in a print data memory region of an electronic memory;
    providing in the memory a blank line memory region for a blank line that is not to be filled with print data;
    successively reading out per line the raster print data from the print data memory region of the memory and supplying the raster print data line by line to the printing unit; and
    after the readout of the nominal number of lines from the print data memory region, then reading out the blank line memory region a number of times, said number of times being a whole number greater than or equal to zero and being dependent on the sheet gap.

9. A method for per-page printing of sheet-shaped recording media in a printing device, in which the recording media are successively supplied, one after another, to at least one printing unit that can be activated per point, a sheet gap between successive recording mediums being provided in a transport direction, comprising the steps of:

subjecting document print data that are structured per page to a rastering process in which raster print data are generated;

respectively providing a predetermined nominal number of lines for the document print data of a page;

successively storing the raster print data line by line in a print data memory region of an electronic memory;

providing in the memory a blank line memory region for a blank line that is not to be filled with print data;

successively reading out per line the raster print data from the print data memory region of the memory and supplying the raster print data to the printing unit; and after the readout of the nominal number of lines from the print data memory region, then reading out the blank line memory region a number of times, said number of times being a whole number greater than or equal to zero and being dependent on the sheet gap.

\* \* \* \* \*